United States Patent [19]

Kanno

[11] Patent Number: 5,654,749

[45] Date of Patent: Aug. 5, 1997

[54] IMAGE DISPLAY APPARATUS

[75] Inventor: Masahiro Kanno, Nagasaki, Japan

[73] Assignee: Mitsubishi Denki Kabushiki Kaisha, Tokyo, Japan

[21] Appl. No.: 142,133

[22] Filed: Oct. 28, 1993

[30] Foreign Application Priority Data

Dec. 7, 1992 [JP] Japan .................................. 4-326465

[51] Int. Cl.$^6$ ................................................ H04N 17/18
[52] U.S. Cl. .................. 348/56; 348/55; 348/57; 348/51
[58] Field of Search ................................ 348/56, 55, 57, 348/51

[56] References Cited

U.S. PATENT DOCUMENTS

| 4,393,400 | 7/1983 | Ikushima et al. | 348/55 |
|---|---|---|---|
| 4,726,246 | 2/1988 | Nishikawa | 348/55 |
| 4,772,944 | 9/1988 | Yoshimura | 348/55 |
| 4,907,860 | 3/1990 | Noble | 348/56 |
| 4,967,268 | 10/1990 | Lipton et al. | 348/56 |
| 4,979,033 | 12/1990 | Stephens | 348/56 |
| 5,084,763 | 1/1992 | Naradate et al. | 348/55 |
| 5,142,642 | 8/1992 | Sudo | 348/56 |
| 5,175,616 | 12/1992 | Milgram et al. | 348/57 |
| 5,245,319 | 9/1993 | Kilian | 348/56 |

FOREIGN PATENT DOCUMENTS

| 62-61493 | 3/1987 | Japan . |
|---|---|---|
| 62-276989 | 12/1987 | Japan . |
| 63-98525 | 6/1988 | Japan . |

*Primary Examiner*—Tommy P. Chin
*Attorney, Agent, or Firm*—Burns, Doane, Swecker & Mathis, LLP

[57] ABSTRACT

An image display apparatus is disclosed which alternately displays an image for the right eye and an image for the left eye on a two-dimensional display and provides a stereoscopic image. A three-dimensional image unit outputs a signal with a shutter control signal superposed on a synchronizing signal or a video signal to a display unit. The display unit provided with an infrared ray transmitting device mounted on the front face thereof separates the shutter control signal from the superposed signal received from the three-dimensional image unit. It alternately displays the image for the right eye and the image for the left eye. The infrared ray transmitting device transmits the shutter control signal. A liquid crystal shutter for the right eye image and a liquid crystal shutter for the left eye image of a liquid crystal shuttered spectacle device are opened and shut in accordance with the shutter control signal.

7 Claims, 5 Drawing Sheets

IMAGE DISPLAY APPARATUS

BACKGROUND OF THE INVENTION

1. Field of the Invention:

The present invention relates to an image display apparatus for displaying a three-dimensional image on a display and providing a stereoscopic image through liquid crystal shuttered spectacles, shutters of which are controlled to obtain the stereoscopic image.

2. Description of the Related Art:

FIG. 1 is a perspective view showing construction of a conventional image display apparatus for example as disclosed in Japanese Laid-open Patent Publication No. 62-61493. Referring to the figure, reference numeral 1 denotes a three-dimensional image generation unit for outputting images for the right eye and for the left eye, 9 denotes a display unit connected with the three-dimensional image generation unit 1 by a video signal line 10 and a synchronizing signal line 11 for displaying an image from the three-dimensional image generation unit 1, and 6 denotes an infrared ray transmitting device for transmitting a shutter control signal, sent over from the three-dimensional image generation unit 1 through a shutter control signal line 12, to a liquid crystal shuttered spectacle device 13 in the form of an infrared ray.

FIG. 2 is a block diagram showing a detailed structure of the apparatus shown in FIG. 1. As shown in FIG. 2, the three-dimensional image generation unit 1 has a three-dimensional image signal generator 2 for generating image signals for the right eye and the left eye, a RGB video signal output circuit 3 accepting an image signal from the three-dimensional image signal generator 2 for generating an RGB video signal, a synchronizing signal generator 4 accepting an image signal from the three-dimensional image signal generator 2 for generating a synchronization signal, and a shutter control signal generator 5 accepting a signal from the three-dimensional image signal generator 2 for generating a shutter control signal.

The liquid crystal shuttered spectacle device 13 is formed of a liquid crystal shutter control device 7 and liquid crystal shuttered spectacles 8. The liquid crystal shuttered spectacles 8 have a liquid crystal shutter for the right eye and a liquid crystal shutter for the left eye. The liquid crystal shutter for the right eye and the liquid crystal shutter for the left eye are controlled to open and shut by the liquid crystal shutter control device 7 respectively.

In the image display apparatus of the described arrangement, the three-dimensional image signal generator 2 alternately generates an image for the right eye and an image for the left eye. The RGB video signal output circuit 3 alternately outputs a RGB video signal for the right eye and a RGB video signal for the left eye. Also the synchronizing signal generator 4 alternately outputs a synchronizing signal for the right eye and a synchronizing signal for the left eye. Accordingly, the display unit 9 alternately displays an image for the right eye and an image for the left eye. The shutter control signal generator 5 generates a shutter control signal synchronized with the display on the display unit 9. More specifically, the shutter control signal is a signal causing the liquid crystal shutter for the right eye to be opened when the image for the right eye is displayed on the display unit 9 and the liquid crystal shutter for the left eye to be opened when the image for the left eye is displayed on the display unit 9.

The shutter control signal is input to the infrared transmitting device 6. The infrared ray transmitting device 6 emits the input shutter control signal in the form of an infrared ray. The liquid crystal shutter control device 7 has an infrared ray receiving portion. The infrared ray receiving portion receives the shutter control signal in the form of an infrared ray and the liquid crystal shutter control device 7, responding to the shutter control signal, alternately opens the liquid crystal shutter for the right eye and the liquid crystal shutter for the left eye. Then, the viewer wearing the liquid crystal shuttered spectacles 8 can alternately see the image for the right eye and the image for the left eye by viewing the display unit 9 through the liquid crystal shuttered spectacles 8. In this way, the viewer can perceive a stereoscopic image.

Thus, by the use of the infrared ray transmitting device 6, the signal line directly connecting the three-dimensional image generation unit 1 and the liquid crystal shutter control device 7 can be eliminated. Therefore, the degree of freedom as to the position of the viewer of the display unit 9 can be increased to some extent. Further, since the liquid crystal shutter control device 7 and the liquid crystal shuttered spectacles 8 are integrated into one liquid crystal shuttered spectacle device 13, viewers taking up their positions with certain degree of freedom can view the same stereoscopic image only by wearing the liquid crystal shuttered spectacle device 13.

In order to attain such a degree of freedom, non-wired signal transmission means such as an infrared ray transmitting device 6 becomes indispensable. Viewers wearing the liquid crystal shuttered spectacle device 13 are facing the display unit 9. Hence, in order that the signal receiving means in the liquid crystal shuttered spectacle devices 13 worn by the viewers accurately receive the shutter control signal, the infrared ray transmitting device 6 or the like must be disposed in the vicinity of the display unit 9.

These days, however, display units 9 designed to look nice using curved lines are prevailing. When the infrared ray transmitting device 6 or the like is disposed in the vicinity of the display unit 9, the presence of the infrared ray transmitting device 6 spoils the appearance, and the presence of the shutter control signal line 12 also spoils the appearance. Thus, there has been a problem that efforts made to design the display unit 9 to look nice become futile.

SUMMARY OF THE INVENTION

The present invention has been made to solve the above mentioned problem. Accordingly, an object of the invention is to provide an image display apparatus capable of accurate transmission and reception of a shutter control signal without spoiling the appearance of the display unit.

An image display apparatus according to the present invention comprises a three-dimensional image unit including a signal superpose circuit for superposing a shutter control signal on at least either of a video signal and a synchronizing signal and outputting the superposed signal, a display unit including a signal separator for separating the shutter control signal from the superposed signal and a signal transmitting device for transmitting the separated shutter control signal, and a liquid crystal shuttered spectacle device whose shutters are controlled to open and shut by the shutter control signal.

The signal superpose circuit of the image display apparatus of the present invention superposes the shutter control signal at least on either of the video signal and the synchronizing signal and is thereby enabled to transmit the shutter control signal not through a shutter control signal line.

With the described arrangement, it is made possible to provide an image display apparatus capable of accurate transmission and reception of a shutter control signal without spoiling the appearance of the display unit.

Further, by disposing the transmitting device of the image display apparatus on the front face of the display unit, it is made possible to provide an image display apparatus achieving transmission and reception of the shutter control signal more accurately.

DETAILED DESCRIPTION OF THE PREFERRED EMBODIMENTS

Figure 1:
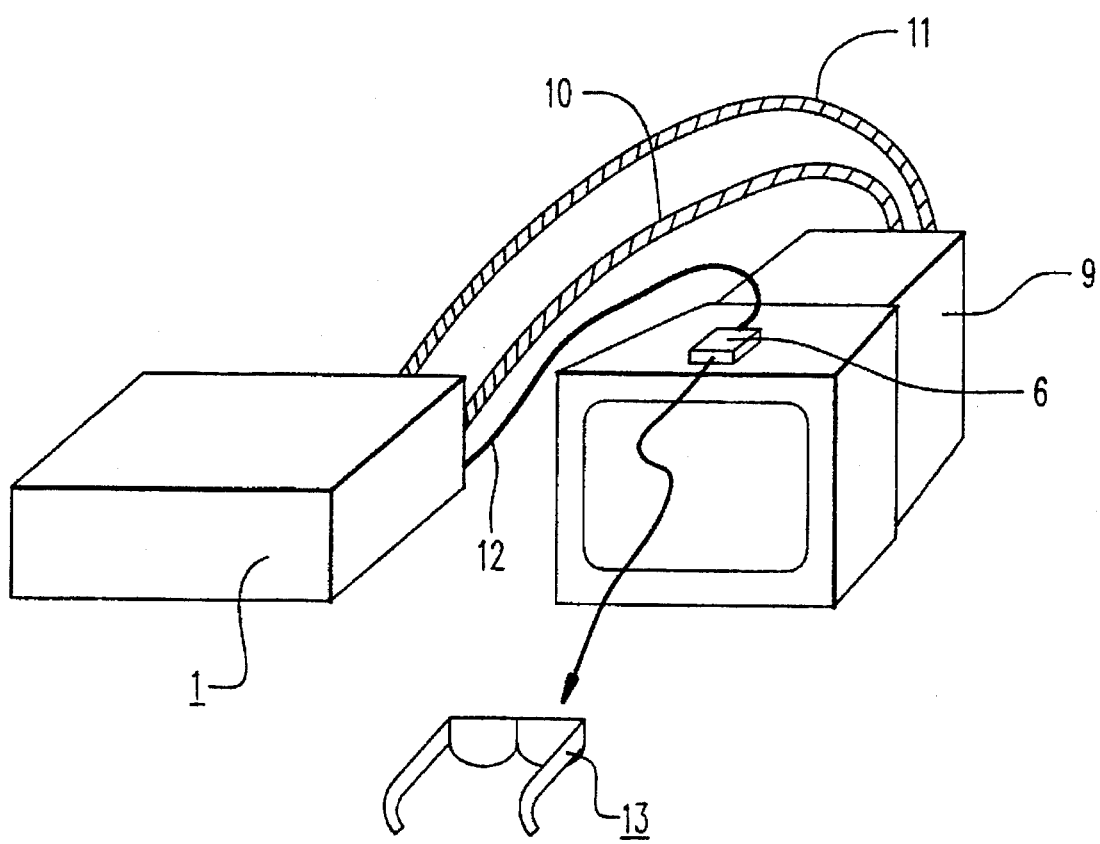
FIG. 1 is a perspective view showing a conventional image display apparatus.
Figure 2:
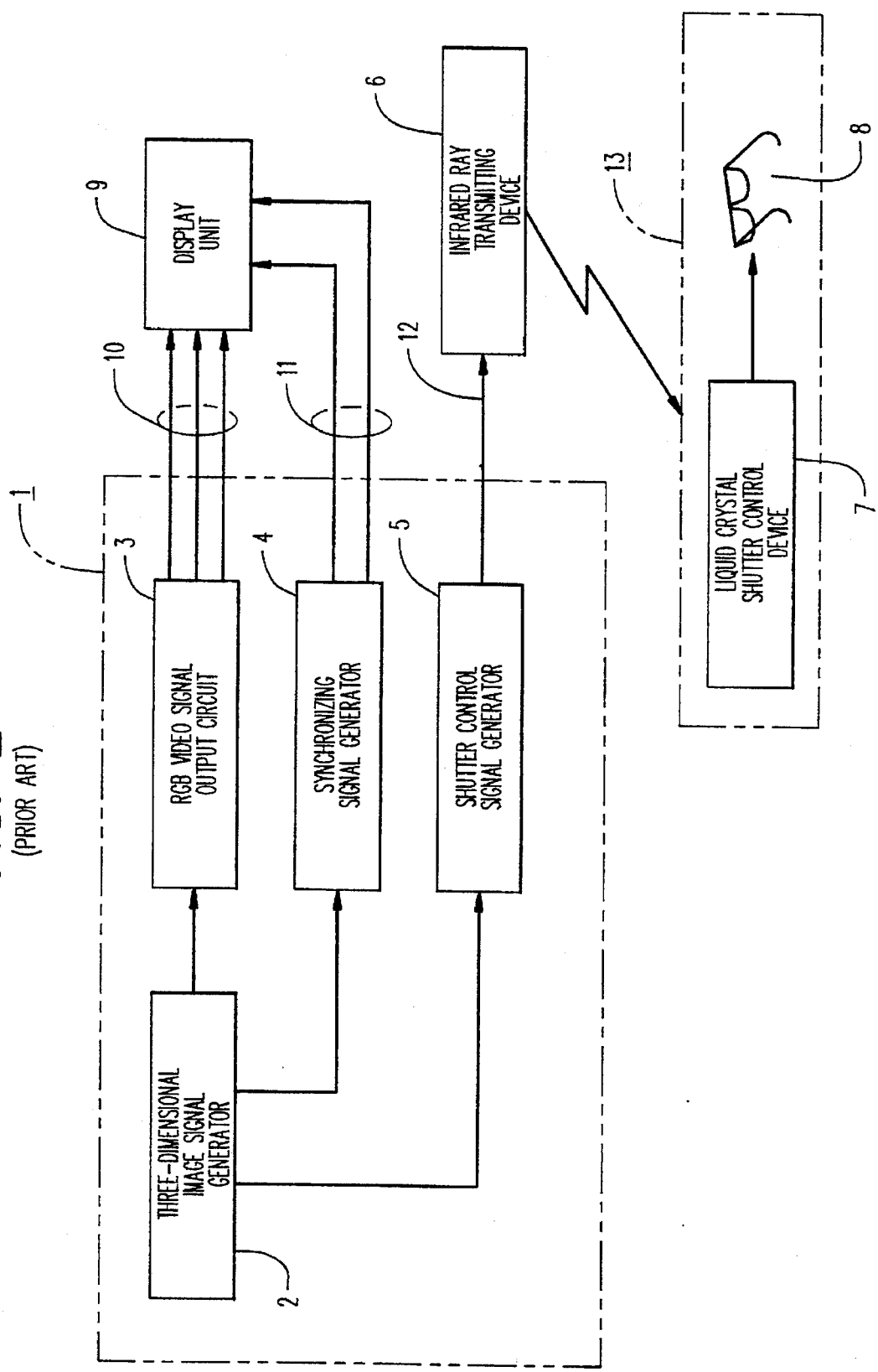
FIG. 2 is a block diagram showing a detailed structure of the conventional image display apparatus.
Figure 3:
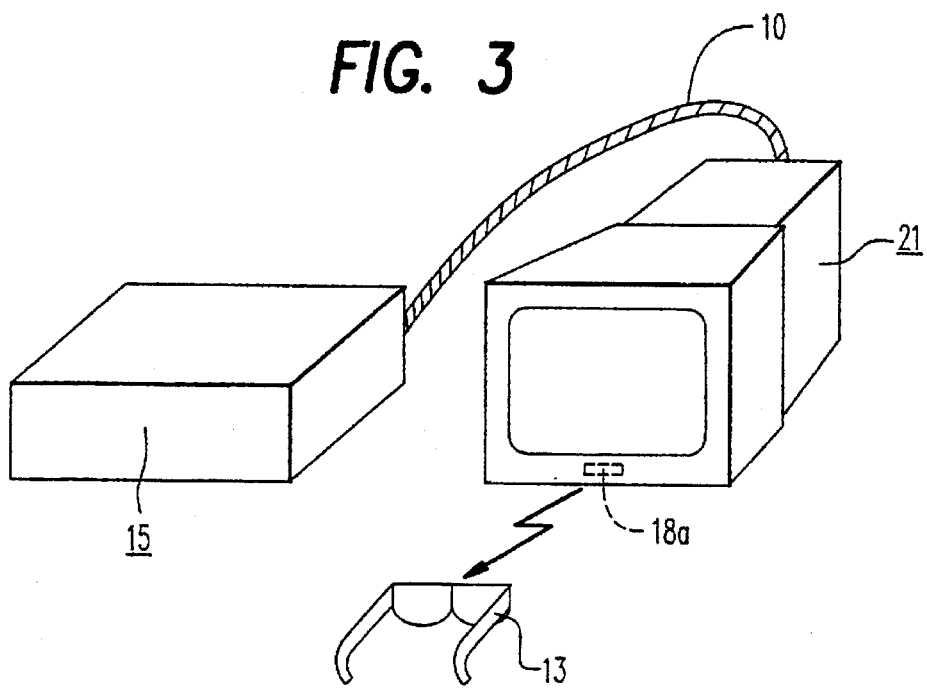
FIG. 3 is a perspective view showing an image display apparatus according to a first embodiment of the present invention.
Figure 4:
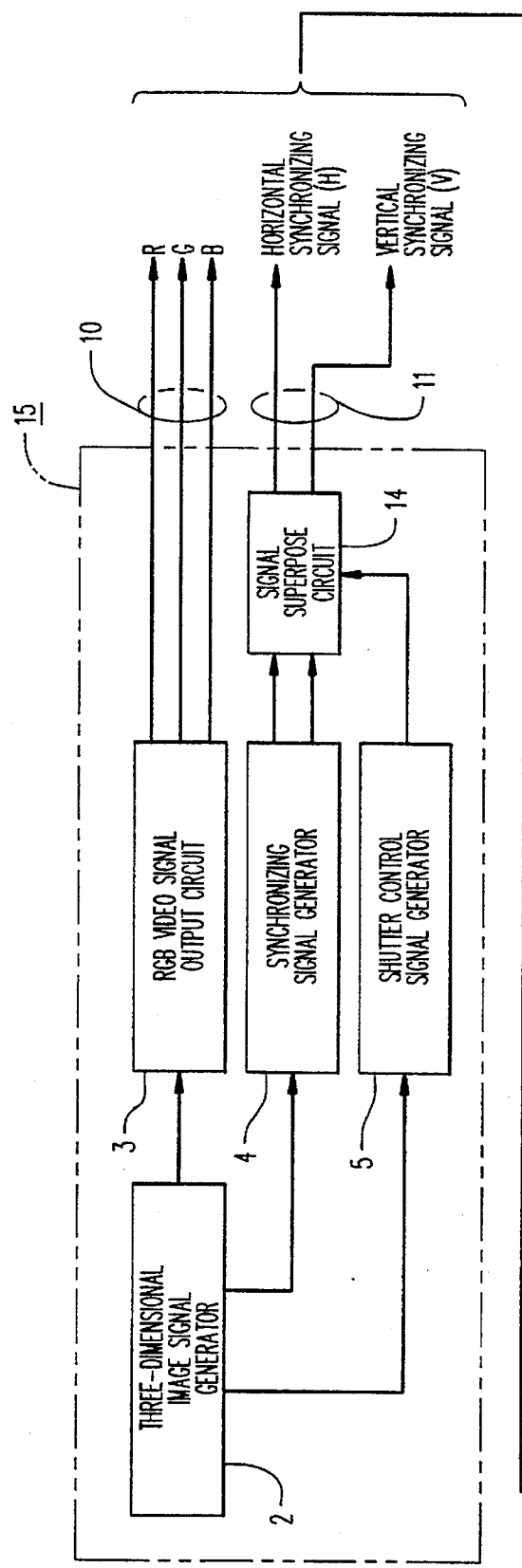
FIG. 4 is a block diagram showing a structure of an image display apparatus according to the first embodiment of the present invention.
Figure 4:
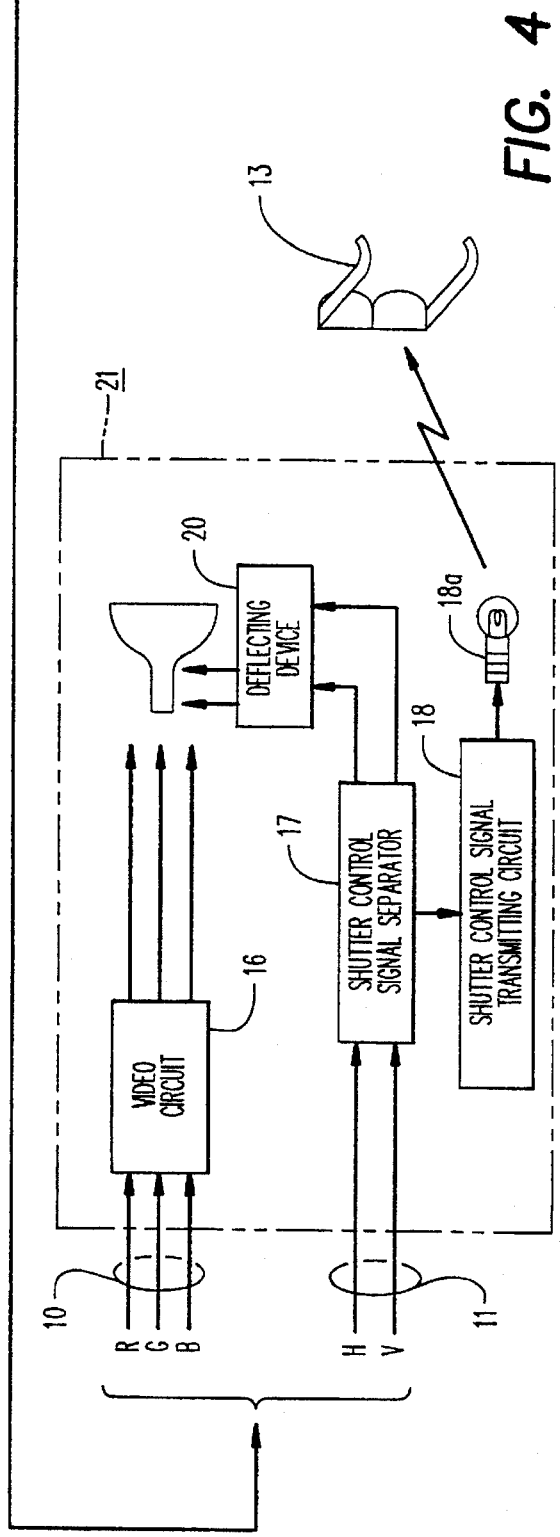

An embodiment of the present invention will be described below. FIG. 3 is a perspective view showing an image display apparatus according to a first embodiment of the present invention. FIG. 4 is a block diagram showing a detailed structure of the apparatus. Corresponding parts in FIG. 3 and FIG. 4 to those in the apparatus of the conventional structure shown in FIG. 1 and FIG. 2 will be denoted by corresponding reference numerals and description of the same will be omitted. Reference numeral 14 denotes a signal superpose circuit for superposing a shutter control signal generated in a shutter control signal generator 5 on a synchronizing signal generated in the synchronizing signal generator 4, 15 denotes a three-dimensional image unit, which includes the aforesaid signal superpose circuit 14, and a three-dimensional image signal generator 2, a RGB video signal output circuit 3, a synchronizing signal generator 4, and the shutter control signal generator 5 similar to those in the conventional apparatus. Reference numeral 16 denotes a video circuit, 17 denotes a shutter control signal separator for separating the shutter control signal superposed on the synchronizing signal by the signal superpose circuit 14 from the synchronizing signal, 18 denotes a shutter control signal transmitting circuit for transmitting the separated shutter control signal to the liquid crystal shuttered spectacle device 13 through a transmitting device 18a, 20 denotes a deflecting device, and 21 denotes a display unit formed of the above members.

Figure 5A:
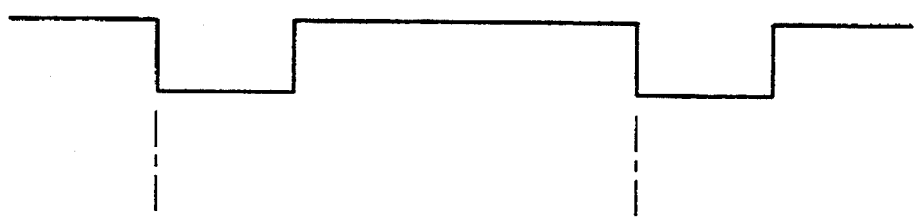
FIG. 5 is a waveform chart showing an example of a vertical synchronization signal and a shutter control signal.
Figure 5B:
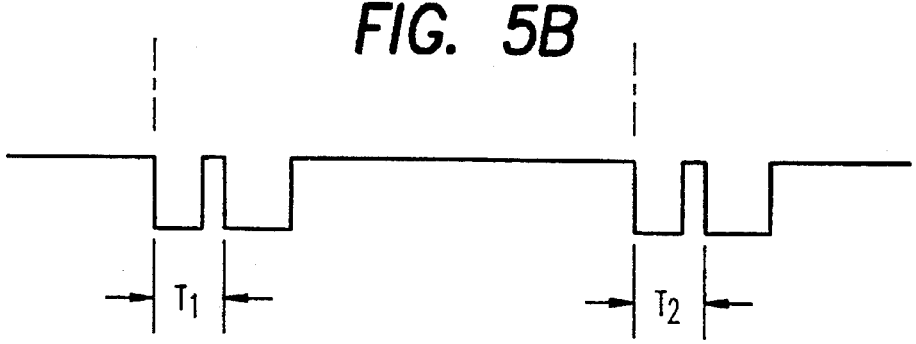

Operation of the image display apparatus arranged as described above will be described below. A shutter control signal generated in the shutter control signal generator 5 is superposed in the signal superpose circuit 14 for example on the vertical synchronizing signal from the synchronizing signal generator 4 and transmitted to the display unit 21 through a synchronizing signal line 11. The waveform of the vertical synchronizing signal is shown in FIG. 5(a) and the waveform of the vertical synchronizing signal having the shutter control signal superposed thereon is shown in FIG. 5(b). While it is required that the liquid crystal shutters are accurately controlled such that, when the displayed image is for the right eye, it is seen by the right eye and, when it is for the left eye, it is seen by the left eye, the accurate control is achieved for example by making the time between the fall of the vertical synchronizing signal and the fall of the shutter control signal for the left eye be different from that for the right eye as indicated by $T_1$ and $T_2$ in FIG. 5(b).

The superposed signal fed into the display unit 21 through the synchronizing signal line 11 is separated in the shutter control signal separator 17 into the original vertical synchronizing signal and shutter control signal. The separated shutter control signal is transmitted from the shutter control signal transmitting circuit 18 to the transmitting device 18a mounted on the front face of the display unit 21 so that an infrared ray is emitted from the transmitting device 18a. The infrared ray is received by a light receiving portion of the liquid crystal shuttered spectacle device 13 worn by a viewer, whereby the opening and shutting of the liquid crystal shutters are controlled so that the displayed image can be accurately perceived as a three-dimensional image. Further, since the shutter control signal line 12 which was used in the conventional apparatus can be eliminated as shown in FIG. 3, the appearance of the display unit 21 can be prevented from being spoiled.

Although, in the above described embodiment, the case where the horizontal synchronizing signal and the vertical synchronizing signal are separated and the shutter control signal is superposed on the vertical synchronizing signal was described, it may also be arranged such that the shutter control signal is superposed on the horizontal synchronizing signal, or the same effects may be obtained even if the shutter control signal is superposed on the composite sync with the horizontal synchronizing signal and the vertical synchronizing signal combined.

Figure 6:
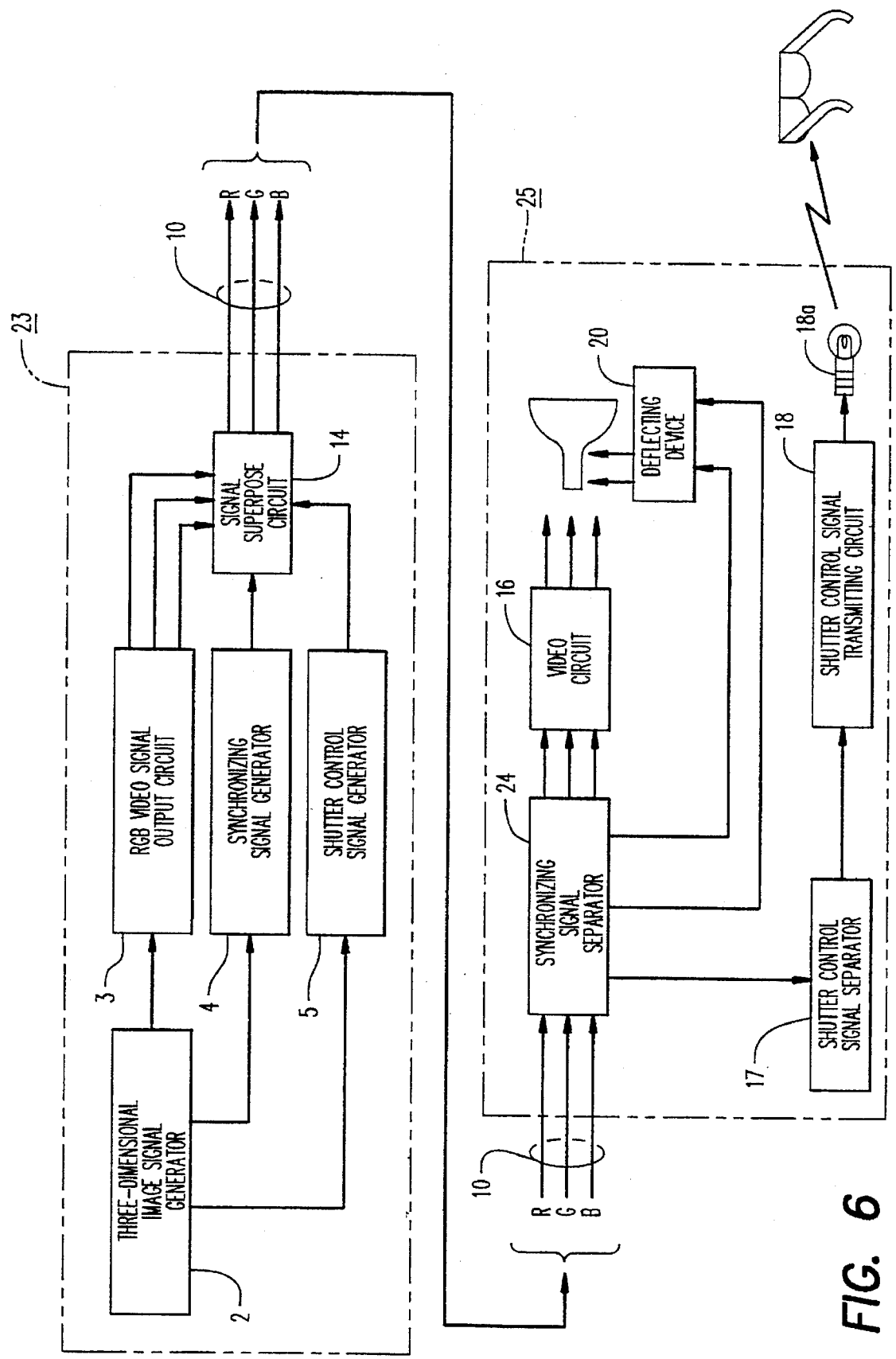
FIG. 6 is a block diagram showing a structure of an image display apparatus according to a second embodiment of the present invention.

FIG. 6 is a block diagram showing a structure of an image display apparatus of a second embodiment of the present invention. Parts in FIG. 6 corresponding to those in the first embodiment shown in FIG. 4 will be denoted by corresponding reference numerals and description of the same will be omitted. Reference numeral 22 denotes a signal superpose circuit for superposing a synchronizing signal from a synchronizing signal generator 4 and a shutter control signal from a shutter control signal generator 5 on a RGB video signal from a RGB video signal output circuit 3 and outputting the superposed signal through a video signal line 10, and reference numeral 23 denotes a three-dimensional image unit formed of this signal superpose circuit 22, a three-dimensional image signal generator 2, the RGB video signal output circuit 3, the synchronizing signal generator 4, and the shutter control signal generator 5.

Reference numeral 24 denotes a synchronizing signal separator circuit for separating synchronizing signals from the signals superposed on the video signal introduced through the video signal line 10, and 25 denotes a display unit formed of this synchronizing signal separator 24, a video circuit 16, a shutter control signal separator 17, a shutter control signal transmitting circuit 18, a transmitting device 18a, and a deflecting device 20. Since, as described above, it is adapted such that the synchronizing signal and the shutter control signal are superposed in the signal superpose circuit 22 on the video signal and the superposed signal is delivered to the side of the display unit 25 through the video signal line 10, the same meritorious effects as obtained with the first embodiment can of course be obtained and, in addition, the synchronizing signal line 11 which was required in the first embodiment can be eliminated, and therefore the appearance of the display unit 25 can correspondingly be improved.

In each of the above described embodiments, the transmitting device 18a of the shutter control signal transmitting circuit 18 is mounted at the lower portion of the front of the bezel of the display unit 21 or 25 as shown in FIG. 3. The position at which the transmitting device is disposed is not limited to that. The same effects as obtained with the above embodiments can be obtained if only the transmitting device is disposed at the position from which the shutter control signal can be accurately received by the light receiving portion of the liquid crystal shuttered spectacle device 13.

Although the display unit 21 or 25 can be formed with a CRT, other display units such as a plasma display may also be used.

Although, in the above description of embodiments, the case where an infrared ray is used as the transmitting means of the shutter control signal was described, the same effects as obtained with the above embodiments can be obtained even if for example an electric wave, a sound wave, a light wave, or the like is used as means for transmission and reception of the shutter control signal.

What is claimed is:

1. An image display apparatus comprising:
   a three-dimensional image unit for generating a video signal for a right eye image and a video signal for a left eye image to be output alternately and synchronizing signals, the image unit having a signal superpose circuit for superposing a shutter control signal on said synchronizing signal;
   a display unit for displaying an image corresponding to the video signal for the right eye image and the video signal for the left eye image output from said three-dimensional image unit, the display unit having a signal separator circuit accepting a superposed signal from said signal superpose circuit for separating the shutter control signal from the superposed signal and a transmitting device for transmitting the shutter control signal extracted in said signal separator circuit; and
   a liquid crystal shuttered spectacle device having liquid crystal shuttered spectacles including a liquid crystal shutter for the right eye image and a liquid crystal shutter for the left eye image and a liquid crystal shutter control device accepting the shutter control signal from said transmitting device for opening and shutting the liquid crystal shutter for the right eye image and the liquid crystal shutter for the left eye image in accordance with the shutter control signal.

2. An image display apparatus according to claim 1, wherein said transmitting device is mounted on a front face of the display unit.

3. An image display apparatus according to claim 1, wherein said signal superpose circuit superposes the shutter control signal on a vertical synchronizing signal.

4. An image display apparatus according to claim 1, wherein said signal superpose circuit superposes the shutter control signal on a horizontal synchronizing signal.

5. An image display apparatus comprising:
   a three-dimensional image unit for generating a video signal for a right eye image and a video signal for a left eye image to be output alternately and synchronizing signals, the image unit having a signal superpose circuit for superposing a shutter control signal on each said video signal;
   a display unit for displaying an image corresponding to the video signal for the right eye image and the video signal for the left eye image output from said three-dimensional image unit, the display unit having a signal separator circuit accepting a superposed signal from said signal superpose circuit for separating the shutter control signal from the superposed signal and a transmitting device for transmitting the shutter control signal extracted in said signal separator circuit; and
   a liquid crystal shuttered spectacle device having liquid crystal shuttered spectacles including a liquid crystal shutter for the right eye image and a liquid crystal shutter for the left eye image and a liquid crystal shutter control device accepting the shutter control signal from said transmitting device for opening and shutting the liquid crystal shutter for the right eye image and the liquid crystal shutter for the left eye image in accordance with the shutter control signal.

6. An image display apparatus according to claim 5, wherein said transmitting device is mounted on a front face of the display unit.

7. An image display apparatus according to claim 3, wherein a time between a starting point of the vertical synchronization signal and a starting point of the shutter control signal for the left eye is different from that for the right eye.

* * * * *